United States Patent
Klemstine et al.

(10) Patent No.: US 12,044,270 B2
(45) Date of Patent: Jul. 23, 2024

(54) LIGHTWEIGHT NODULAR IRON CRANKSHAFT FOR HEAVY DUTY ENGINE

(71) Applicant: GM Global Technology Operations LLC, Detroit, MI (US)

(72) Inventors: David C. Klemstine, Orlon, MI (US); Guirong Cao, Troy, MI (US); Jianghuai Yang, Rochester Hills, MI (US); William A. Berry, Davison, MI (US); Qigui Wang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 27 days.

(21) Appl. No.: 17/704,524

(22) Filed: Mar. 25, 2022

(65) Prior Publication Data

US 2023/0304529 A1 Sep. 28, 2023

(51) Int. Cl.
*F16C 3/04* (2006.01)
*B22D 19/00* (2006.01)
(Continued)

(52) U.S. Cl.
CPC ............ *F16C 3/08* (2013.01); *B22D 19/0072* (2013.01); *F16C 3/14* (2013.01); *B23P 2700/07* (2013.01);
(Continued)

(58) Field of Classification Search
CPC ...... F16C 3/06; F16C 3/08; F16C 3/14; F16C 3/16; F16C 2202/06; F16C 2204/60; F16C 2220/02; B22D 19/0072; B23P 2700/07
See application file for complete search history.

(56) References Cited

U.S. PATENT DOCUMENTS 2,917,946 A * 12/1959 Martin ..................... F16C 3/08
74/596
9,970,476 B2 * 5/2018 Murrish ................ B22D 25/02
(Continued)

FOREIGN PATENT DOCUMENTS

CN 201258906 Y * 6/2009
CN 109654111 A * 4/2019 ................ F16C 3/08
(Continued)

OTHER PUBLICATIONS

Graphite degeneration in the superficial layer of high Si-ductile iron casting; https://www.sciencedirect.com/science/article/pii/S2238785419310786?ref=pdf_download&fr=RR-2&rr=7d1147281a2d07a0; Published Sep. 13, 2019 (Year: 2019).*
(Continued)

*Primary Examiner* — Adam D Rogers
(74) *Attorney, Agent, or Firm* — Vivacqua Crane PLLC

(57) ABSTRACT

An automobile vehicle crankshaft including a crankshaft casting of a nodular iron. The crankshaft casting includes multiple main journals coaxially aligned on a common crankshaft casting axis. Multiple crankpin journals are fixedly connected to the main journals by individual webs. Multiple lightening holes have individual ones of the multiple lightening holes integrally formed within individual ones of the crankpin journals during casting. A bubble space is located proximate to a mid-portion of selected ones of the multiple lightening holes of the crankpin journals. The bubble space locally increases a passage size of the selected ones of the multiple lightening holes and reduces a mass of the individual ones of the crankpin journals.

20 Claims, 4 Drawing Sheets

(51) Int. Cl.
*F16C 3/08* (2006.01)
*F16C 3/14* (2006.01)

(52) U.S. Cl.
CPC ...... *F16C 2202/06* (2013.01); *F16C 2204/60* (2013.01); *F16C 2220/02* (2013.01)

(56) References Cited

U.S. PATENT DOCUMENTS

| | | | | |
|---|---|---|---|---|
| 10,335,851 | B2 * | 7/2019 | Yang | B22C 9/02 |
| 10,352,352 | B2 * | 7/2019 | Murrish | F16C 3/12 |
| 11,313,409 | B1 * | 4/2022 | Holda | F01M 1/06 |
| 11,549,549 | B2 * | 1/2023 | Murrish | F16C 3/08 |
| 11,618,937 | B2 * | 4/2023 | Yang | C22C 37/10 |
| | | | | 420/17 |
| 11,619,255 | B1 * | 4/2023 | Klemstine | F16C 3/20 |
| | | | | 74/603 |
| 2007/0193405 | A1 * | 8/2007 | Shibano | B22C 9/24 |
| | | | | 74/596 |
| 2010/0107808 | A1 * | 5/2010 | Aiderton | B23P 15/00 |
| | | | | 29/888.08 |
| 2016/0084295 | A1 * | 3/2016 | Murrish | F16F 15/283 |
| | | | | 74/603 |
| 2018/0274066 | A1 * | 9/2018 | Papis | C22C 37/04 |
| 2021/0115540 | A1 | 4/2021 | Yang et al. | |

FOREIGN PATENT DOCUMENTS

| | | | | |
|---|---|---|---|---|
| CN | 111637145 A | * | 9/2020 | ............... B22C 9/22 |
| DE | 483381 C | * | 9/1929 | |
| DE | 1216030 B | * | 5/1966 | |
| DE | 19922303 A1 | * | 11/2000 | ............... B23P 15/00 |
| FR | 1219693 A | * | 5/1960 | |
| FR | 2948157 A1 | * | 1/2011 | ............... B22C 9/108 |
| GB | 481928 A | * | 3/1938 | |
| GB | 644841 A | * | 10/1950 | |
| GB | 771733 A | * | 4/1957 | |
| GB | 2172691 A | * | 9/1986 | ............... B22C 9/22 |
| JP | H04276020 A | * | 10/1992 | |

OTHER PUBLICATIONS

Machine translation of CN 109654111 A dated Oct. 19, 2023.*

* cited by examiner

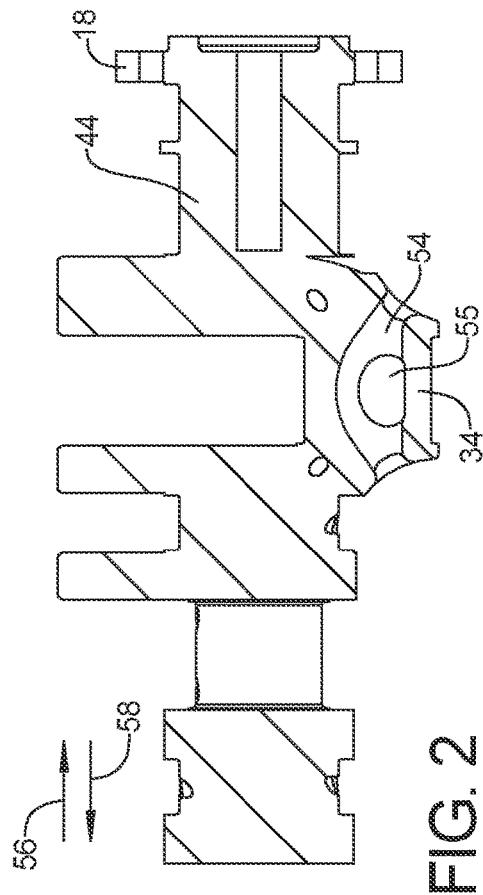
FIG. 2
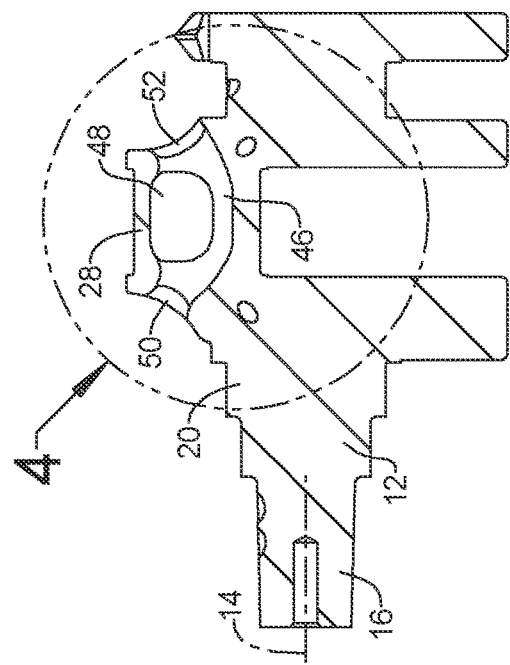
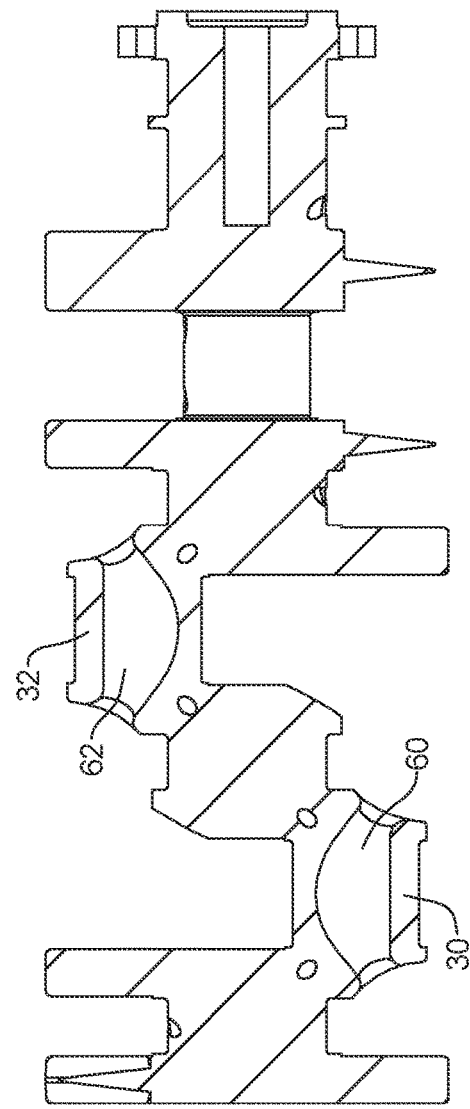
FIG. 3
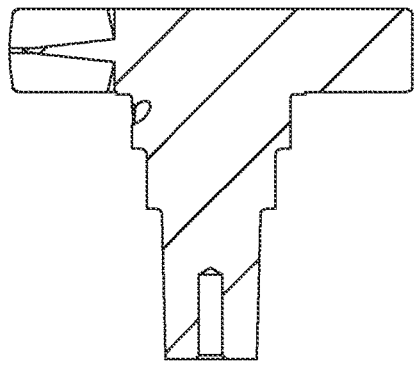

LIGHTWEIGHT NODULAR IRON CRANKSHAFT FOR HEAVY DUTY ENGINE

GOVERNMENT LICENSE RIGHTS

This invention was made with government support under United States Department of Energy (USDOE) contract: DE-EE0008877 awarded by the United States Department of Energy. The government has certain rights to the invention.

INTRODUCTION

The present disclosure relates to systems and methods to balance crankshafts for automobile vehicle engines.

Iron cast crankshafts for use in automobile vehicle engines commonly include counterweights to balance rotational forces acting on the pin journals of the crankshaft induced by piston loads. Known crankshaft designs commonly add additional weight or mass at locations of the counterweights to avoid increasing the size of the cast counterweights, which must operate within predetermined physical space limits. One of the commonly used materials applied to increase counterweight mass is tungsten. These additional masses must be fixed in place as inserts which increases costs of the crankshafts, as well as increasing overall engine weight.

Thus, while current crankshaft counterweight masses achieve their intended purpose to balance crankshaft loading, there is a need for a new and improved crankshaft design which eliminates the need for added counterweight mass.

SUMMARY

According to several aspects, an automobile vehicle crankshaft includes a casting of a nodular iron which includes: multiple main journals coaxially aligned on a common crankshaft axis; multiple crankpin journals fixedly connected to the main journals by individual webs; multiple lightening holes having individual ones of the multiple lightening holes integrally formed within individual ones of the crankpin journals during casting. A bubble space is located proximate to a mid-portion of selected ones of the multiple lightening holes of the crankpin journals. The bubble space locally increases a passage size of the selected ones of the lightening holes and reduces a mass of the individual ones of the crankpin journals.

In another aspect of the present disclosure, the multiple lightening holes of the crankpin journals have a generally V-shaped geometry. A first opening end of the selected ones of the lightening holes of the crankpin journals have a first diameter and a second opening end of the selected ones of the lightening holes have a second diameter.

In another aspect of the present disclosure, the first diameter is smaller than the second diameter.

In another aspect of the present disclosure, a skin surface of the bubble space is approximately 0.5 mm deep and reduces at least one material property of the crankshaft.

In another aspect of the present disclosure, a Young's modulus of the skin surface of the bubble space is reduced by approximately 15% compared to an overall Young's modulus of the casting.

In another aspect of the present disclosure, a tensile strength of the skin surface of the bubble space is reduced by approximately 30% compared to an overall tensile strength of the casting.

In another aspect of the present disclosure, a fatigue strength of the skin surface of the bubble space is reduced by approximately 30% compared to an overall fatigue strength of the casting.

In another aspect of the present disclosure, the nodular iron defines a high modulus iron.

In another aspect of the present disclosure, a center of a first one of the bubble spaces is displaced laterally with respect to a center of a second one of the bubble spaces.

In another aspect of the present disclosure, a main journal lightening hole formed in individual ones of the main journals.

According to several aspects, an automobile vehicle casting includes a crankshaft casting of a nodular iron including: multiple main journals coaxially aligned on a common crankshaft axis; multiple crankpin journals fixedly connected to the main journals by individual webs; and multiple counterweights fixedly connected to the casting. Multiple lightening holes are integrally formed within the main journals and in individual ones of the crankpin journals during casting. The multiple lightening holes of the crankpin journals have a generally V-shaped geometry. A bubble space is located proximate to a mid-portion of selected ones of the multiple lightening holes of the crankpin journals. The bubble space locally increases a passage size of the selected ones of the lightening holes and reduces a mass of the individual ones of the crankpin journals.

In another aspect of the present disclosure, smoothly curving regions transition between the lightening holes and the bubble space.

In another aspect of the present disclosure, a skin surface of the bubble space is approximately 0.5 mm deep and reduces at least one of a Young's modulus, a tensile strength and a fatigue strength at the skin surface.

In another aspect of the present disclosure, a bottom portion of the V-shaped geometry of the multiple lightening holes of the crankpin journals is directed toward the common crankshaft axis.

In another aspect of the present disclosure, an oil passage extending into individual ones of the crankpin journals passes outside of the lightening holes.

In another aspect of the present disclosure, the V-shaped geometry and the bubble space of the multiple lightening holes of the crankpin journals normalize a stress across a length of the crankshaft.

In another aspect of the present disclosure, the V-shaped geometry and the bubble space of the multiple lightening holes balance the crankshaft and obviate a need for a heavy metal balancing insert added to the counterweights.

According to several aspects, a method to produce a reduced weight automobile vehicle crankshaft comprises: creating a casting of a nodular iron including: coaxially aligning multiple main journals on a common crankshaft axis; and fixedly connecting multiple crankpin journals between successive ones of the multiple main journals by individual webs; forming multiple lightening holes having individual ones of the multiple lightening holes within individual ones of the crankpin journals during casting; and locating a bubble space proximate to a mid-portion of selected ones of the multiple lightening holes, the bubble space locally increasing a passage size of the selected ones of the lightening holes and thereby reducing a mass of the individual ones of the crankpin journals.

In another aspect of the present disclosure, the method further comprises forming the multiple lightening holes having a generally V-shaped geometry.

In another aspect of the present disclosure, the method further comprises interspacing multiple counterweights along the crankshaft, the multiple counterweights also cast of the nodular iron.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a cross sectional elevational view taken at section 2 of FIG. 1;

FIG. 3 is a cross sectional elevational view taken at section 3 of FIG. 1;

DETAILED DESCRIPTION

The following description is merely exemplary in nature and is not intended to limit the present disclosure, application, or uses.

Figure 1:
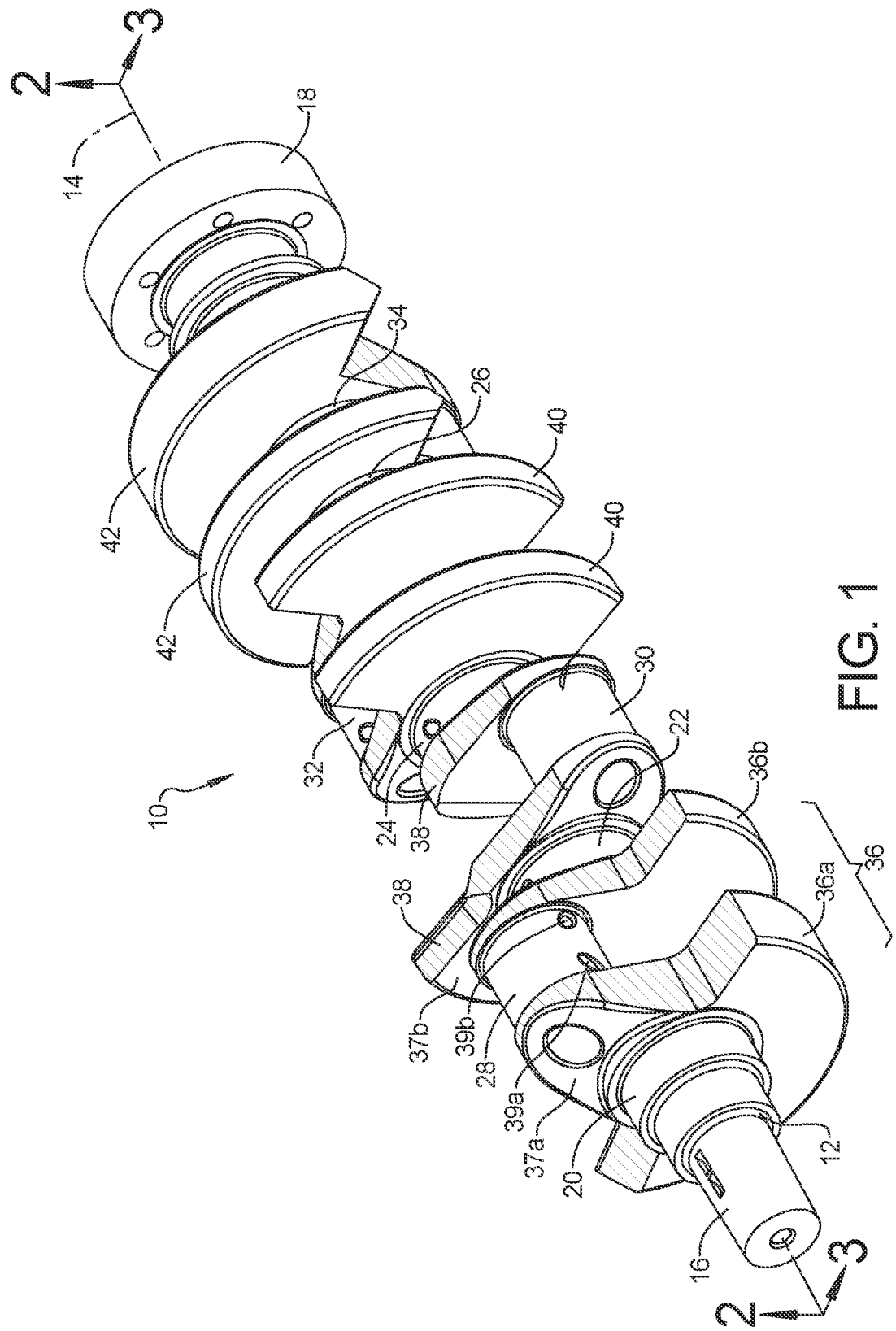
FIG. 1 is a front elevational perspective view of a nodular iron crankshaft according to an exemplary aspect.

Referring to FIG. 1, a reduced weight nodular iron crankshaft and a method to produce a reduced weight nodular iron crankshaft 10 of the present disclosure includes a cast nodular iron crankshaft 12 having components formed about and axially rotatable with respect to a longitudinal rotational axis 14. The cast nodular iron crankshaft 12 in an exemplary aspect shown supports a 4-cylinder engine, however a nodular iron crankshaft modified from FIG. 1 may be provided to support any number of engine cylinders using the design features of the cast nodular iron crankshaft 12. The nodular iron crankshaft 12 includes components directly aligned along the longitudinal rotational axis 14 including a crank nose 16 and a flywheel mounting flange 18. Additional components directly aligned along the longitudinal rotational axis 14 include a first main journal 20, a second main journal 22, a third main journal 24 and a fourth main journal 26. A fifth main journal, not visible in this view, is shown and described in reference to FIG. 2.

Components of the cast nodular iron crankshaft 12 which are offset from the longitudinal rotational axis 14 include a first pin journal 28, a second pin journal 30, a third pin journal 32 and a fourth pin journal 34. Rotational load balancing of the cast nodular iron crankshaft 12 is achieved in part using paired counterweights connected to the individual pin journals and to successive ones of the main journals. The paired counterweights have common components including counterweight portions connected by crankpin journal webs to the individual pin journals. For example, to balance a load of the first pin journal 28 a first paired counterweight 36 includes a first counterweight portion 36a connected to the first main journal 20 and to the first pin journal 28 by a first crankpin journal web 37, and a second counterweight portion 36b connected to the second main journal 22 and also to the first pin journal 28 by a second crankpin journal web 37b. Individual ones of the pin journals including the first pin journal 28 also include at least one crankpin oil hole such as a first crankpin journal oil hole 39a and a second crankpin journal oil hole 39b to deliver lubrication oil to the first pin journal 28. The paired counterweights further include a second paired counterweight 38 connected to and balancing a load of the second pin journal 30, a third paired counterweight 40 connected to and balancing a load of the third pin journal 32, and a fourth paired counterweight 42 connected to and balancing a load of the fourth pin journal 34.

Referring to FIG. 2 and again to FIG. 1, to eliminate a need to further load balance the cast nodular iron crankshaft 12 by fixing additional weight to distal ends of the counterweights, such as by the addition of heavy metals including tungsten, crankshaft load balancing is accomplished by the formation of shaped lightening holes in individual ones of the pin journals during casting of the cast nodular iron crankshaft 12. The lightening holes are "tuned" during crankshaft design for size, shape and location to reduce crankshaft weight and achieve crankshaft load balancing while eliminating the need to add additional weight to the ends of the counterweights as is common in known crankshaft designs.

With continuing reference to FIG. 2, the pin journals positioned at opposed ends of the cast nodular iron crankshaft 12 defining the first pin journal 28 and the fourth pin journal 34 have been determined to achieve maximum crankshaft load balancing by the addition of V-shaped lightening holes individually having a bubble space defining a bubble-shaped portion located to provide maximum pin journal mass reduction. The bubble space or bubble-shaped portion is located proximate to a mid-portion of selected ones of the multiple lightening holes of the crankpin journals and may be shifted as noted below with respect to FIG. 4. A first V-shaped lightening hole 46 is located in the first pin journal 28. The first V-shaped lightening hole 46 is created within the first pin journal 28 during casting of the cast nodular iron crankshaft 12 and includes a first bubble-shaped portion 48 outwardly directed with respect to the longitudinal rotational axis 14. A first opening 50 into the first V-shaped lightening hole 46 is directed toward the crank nose 16 and an opposed second opening 52 is directed toward the flywheel mounting flange 18. A second V-shaped lightening hole 54 including a second bubble-shaped portion 55 outwardly directed with respect to the longitudinal rotational axis 14 is created within the fourth pin journal 34 during casting which may be configured as a mirror image of the first V-shaped lightening hole 46 and the first bubble-shaped portion 48. According to several aspects the first bubble-shaped portion 48 may be laterally displaced during a design phase of the 14 to maximize a mass shift away from the first main journal 20 and therefore to maximize load balance of the cast nodular iron crankshaft 12. Lateral displacement may be in a first displacement direction 56 away from the first main journal 20 or in a second displacement direction 58 which is toward the first main journal 20. The second bubble-shaped portion 55 may be laterally displaced during a design phase of the cast nodular iron crankshaft 12 to maximize a mass shift away from the flywheel mounting flange 18 and therefore to maximize load balance of the cast nodular iron crankshaft 12.

Referring to FIG. 3 and again to FIG. 2, according to several aspects, a third V-shaped lightening hole 60 is created within the second pin journal 30 during casting and a fourth V-shaped lightening hole 62 is created within the third pin journal 32. According to several aspects, the third V-shaped lightening hole 60 and the fourth V-shaped lightening hole 62 lack the feature of the bubble-shaped portion, as shown, unless during analysis it is determined that balancing the cast nodular iron crankshaft 12 also requires the use of the bubble-shaped portion in the third V-shaped lightening hole 60 and the fourth V-shaped lightening hole 62. It is noted that the first V-shaped lightening hole 46, the second V-shaped lightening hole 54, the third V-shaped lightening hole 60 and the fourth V-shaped lightening hole 62 are individually provided in an as-cast condition and do not require post casting machining or de-burring to achieve crankshaft balancing requirements.

Referring to FIG. 4 and again to FIGS. 1 through 3, further details of the first V-shaped lightening hole 46 and details common to the four pin journals are discussed herein in reference to the first V-shaped lightening hole 46 and the first pin journal 28, therefore no further discussion is provided herein to further describe the remaining pin journals and pin journals. Transition regions are provided between the main journals and the pin journals to improve crankshaft fatigue performance. A first transition region 64 of the first pin journal 28 is bounded between a first reference plane 66 defined at a first surface 68 of the first pin journal 28 and a second reference plane 70 defined by a second surface 71 of a first raised shoulder 72 defining an outer extent of a machined contact surface 74 of the first pin journal 28.

A second transition region 76 of the first pin journal 28 is oppositely directed with respect to the first transition region 64 and is bounded between a third reference plane 78 defined at a third surface 80 of the first pin journal 28 and a fourth reference plane 82 defined by a fourth surface 83 of a second raised shoulder 84 defining an outer extent of the machined contact surface 74 of the first pin journal 28. The transition regions have a large effect on a frequency response function (FRF) at the fillets provided with the cast nodular iron crankshaft 1. An exemplary configuration of a first pin fillet 86 is provided between an intersection of a mass defining the first pin journal 28 and the fourth reference plane 82 of the second transition region 76. Similarly, an exemplary configuration of a first main fillet 88 is provided between an intersection of a mass defining the second main journal 22 and the third reference plane 78.

Journal oilways including at least a first main journal oilway 90 are provided in individual ones of the pin journals and the main journals. The first opening 50 defines a curvature aligning the first opening 50 into the first V-shaped lightening hole 46 with a first concave-shaped surface 92 of the first pin journal 28. Similarly, the second opening 52 defines a curvature aligning the second opening 52 into the first V-shaped lightening hole 46 with a second concave-shaped surface 94 of the first pin journal 28.

The first bubble-shaped portion 48 includes multiple transition and bubble surfaces including a first concave-shaped transition surface 96 located proximate to and facing toward the first opening 50. The first concave-shaped transition surface 96 transitions into a first convex-shaped surface 98 which further transitions into a straight segment 100 proximate to a center of the first bubble-shaped portion 48. The straight segment 100 then transitions into a second convex-shaped surface 102. The second convex-shaped surface 102 then transitions into a second concave-shaped transition surface 104 located proximate to and facing toward the second opening 52. The first bubble-shaped portion 48 faces outwardly with respect to the longitudinal rotational axis 14 and is oppositely positioned with respect to a bottom V-section 106 of the first bubble-shaped portion 48.

According to several aspects, a lateral centerline 108 of the first bubble-shaped portion 48 is oriented transverse to the machined contact surface 74 of the first pin journal 28. As previously noted with respect to FIG. 2, the lateral centerline 108 and therefore a lateral position of the first bubble-shaped portion 48 may be shifted in either the first displacement direction 56 away from the first main journal 20 or in the second displacement direction 58.

Figure 4:
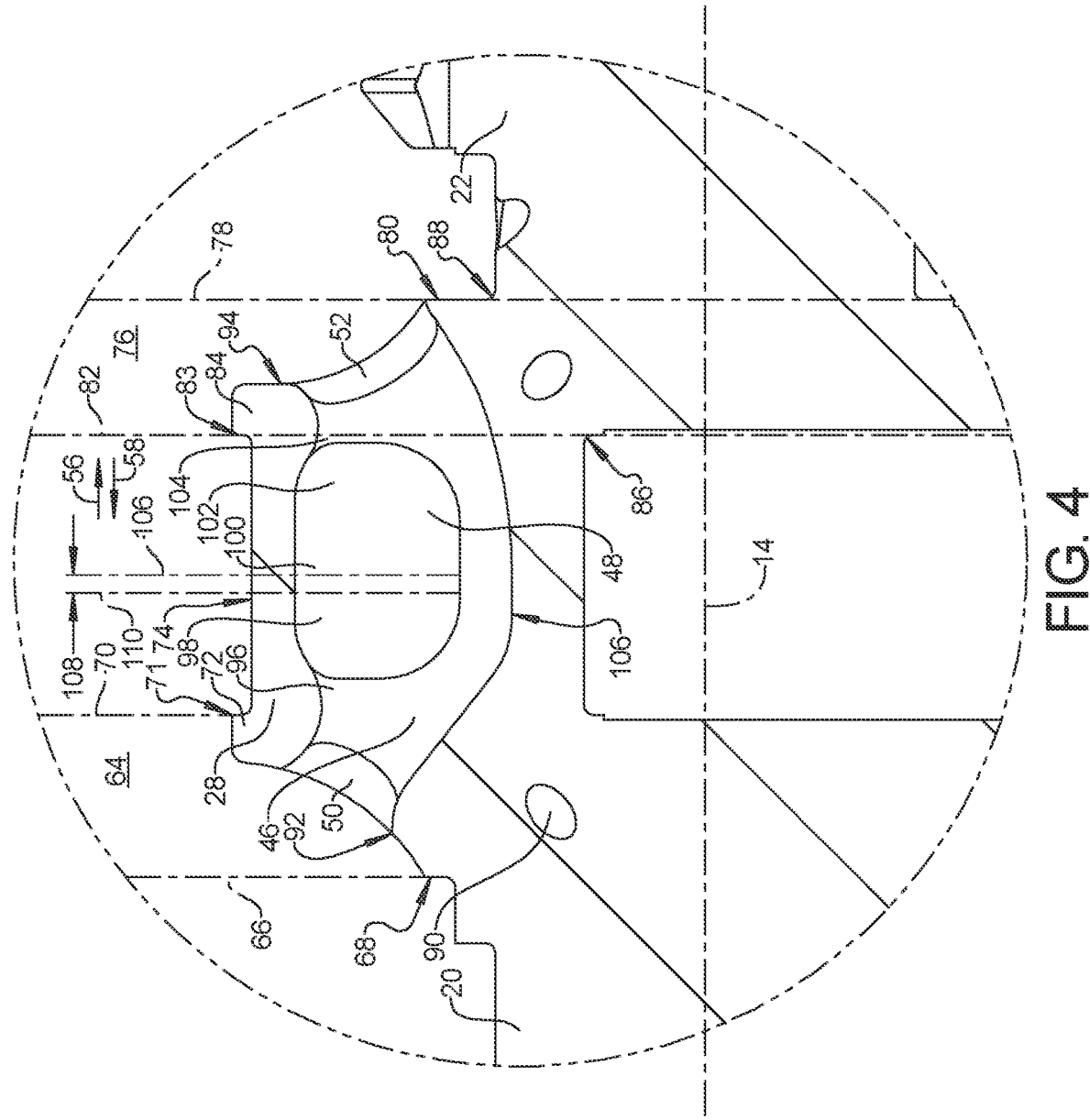
FIG. 4 is a cross sectional elevational view of area 4 of FIG. 2.

Referring to FIG. 5 and again to FIGS. 2 and 4, the exemplary first bubble-shaped portion 48 may have a same size of the 50 and the 52, or the 50 may have a different opening size than the 52. An as-cast pin journal lightening hole inner skin surface 112 may be retained without further deburring or surface smoothing after casting as desired.

Figure 5:
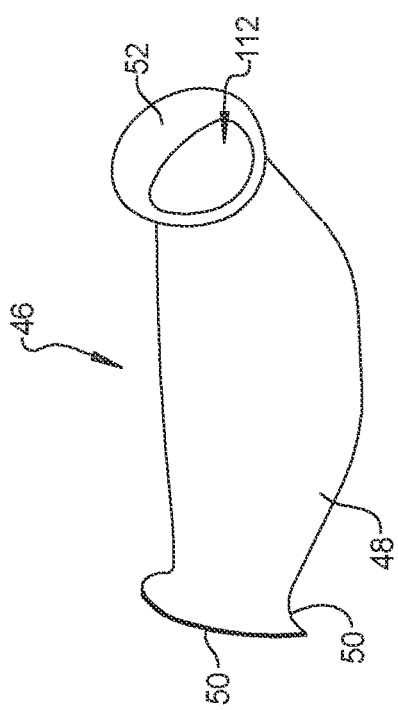
FIG. 5 is a side elevational view of a lightening hole according to an exemplary aspect.

Referring to FIG. 6 and again to FIG. 5, during durability analysis is has been determined that the pin journal lightening hole inner skin surface 112 having a depth of approximately 0.5 mm at a first outer portion 114 of the bubble portion and at a second outer portion 116 opposed to the bubble portion exhibits reduced material properties compared to other regions of the cast nodular iron crankshaft 12. It has therefore been assumed that a Young's modulus (E) is reduced by approximately 15%, and a tensile strength (TS) and a fatigue strength (FS) in the pin journal lightening hole inner skin surface 112 are decreased by approximately 30%.

According to several aspects the lightening holes as described with particularity with respect to FIGS. 2 and 4 are provided only in the pin journals. It is also noted cast lightening holes or drawing holes similar in configuration to the lightening holes described herein and used in the pin journals may also be provided in the main journals.

Figure 6:
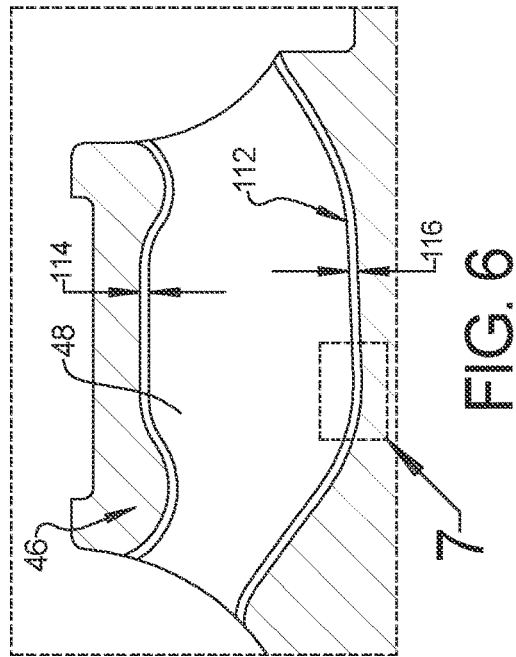
FIG. 6 is a cross sectional view of a lightening hole according to an exemplary aspect.
Figure 7:
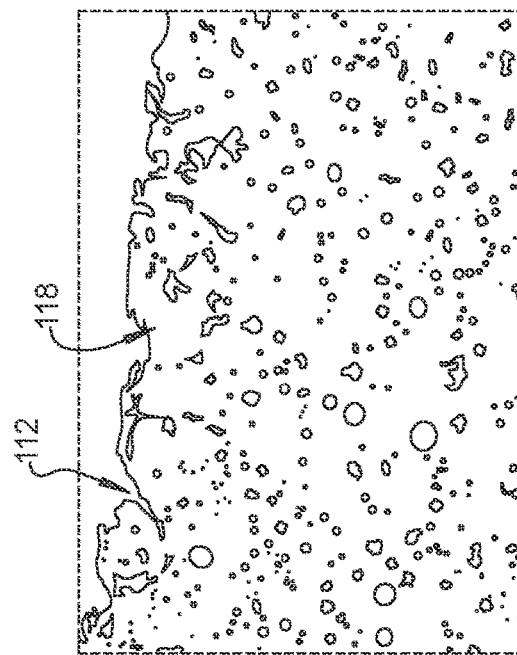
FIG. 7 is a cross sectional view of area 7 of FIG. 6.

Referring to FIG. 7 and again to FIG. 6, in the as-cast condition of the pin journal lightening hole inner skin surface 112 a degradation skin layer 118 may be present. The possibility of the degradation skin layer 118 being present supports the Young's modulus (E) being reduced by approximately 15%, and the tensile strength (TS) and the fatigue strength (FS) in the pin journal lightening hole inner skin surface 112 being decreased by approximately 30%.

The nodular iron alloys used for the crankshafts including the cast nodular iron crankshaft 12 defined herein are described in greater detail in reference to United States Patent Application Publication US2021/0115540, issued on Apr. 22, 2021, the subject matter of which is incorporated herein by reference. The nodular iron alloys may include iron, about 2.2 to about 3.2 weight percent (or exactly 2.2-3.2 wt %) carbon, about 1.7 to about 2.3 weight percent (or exactly 1.7-2.3 wt %) silicon, about 0.2 to about 0.6 weight percent (or exactly 0.2-0.6 wt %) manganese, about 0.2 to about 0.6 weight percent (or exactly 0.2-0.6 wt %) copper, about 0.1 to about 0.4 weight percent (or exactly 0.1-0.4 wt %) chromium, about 0.4 to about 0.8 weight percent (or exactly 0.4-0.8 wt %) nickel, about 0.15 to about 0.45 weight percent (or exactly 0.15-0.45 wt %) molybdenum, about 0.2 to about 1.0 weight percent (or exactly 0.2-1.0 wt %) cobalt, and about 0.02 to about 0.06 weight percent (or exactly 0.02-0.06 wt %) magnesium. A carbon equivalent of about 2.8 to about 4.0 weight percent is maintained. The iron may be provided in an amount of at least 90 weight percent. The iron may be present in an amount of greater than 90% of a pearlite microstructure. The iron surrounds a plurality of graphite nodules, wherein a majority of the graphite nodules have a diameter in a range of 1 to 5 micrometers, thereby defining a nodular iron alloy.

The nodular iron alloy may have a nodularity greater than 85%, and the graphite nodules may have a number density of greater than 200 graphite nodules per square millimeter. The iron is present in an amount greater than 90% of a pearlite microstructure, wherein the iron surrounds a plurality of the graphite nodules.

The nodular iron alloy may also include one or more of the following: phosphorus in an amount not exceeding 0.03 weight percent; sulfur in an amount not exceeding 0.02 weight percent; and one or more rare earth elements in an amount not exceeding 0.002 weight percent in total. For example, the nodular iron alloy may contain iron, carbon, silicon, manganese, copper, chromium, nickel, molybdenum, cobalt, and magnesium, and which may also contain phosphorus, sulfur, and rare earth element(s). The rare earth element(s) included may be cerium alone or in combination with other rare earth elements. The nodular iron alloy has a Young's modulus in a range of 175 to 195 GPa, and an as-cast ultimate tensile strength in a range of 750 to 950 megapascal pressure unit (MPa).

A reduced weight nodular iron crankshaft and method to produce a reduced weight nodular iron crankshaft 10 of the present disclosure includes lightening holes that are shaped so that stress is normalized across a length of the crankshaft. The crankshaft may be balanced without the use of heavy metal inserts such as tungsten in the counterweights. The nodular iron crankshaft shows similar durability performance as a forged steel crankshaft based on comprehensive computer aided engineering (CAE) analysis.

A reduced weight nodular iron crankshaft and method to produce a reduced weight nodular iron crankshaft 10 of the present disclosure offers several advantages. These include a lightweight nodular iron crankshaft for heavy duty engines having lightening holes in all main and pin journals. No heavy and expensive (e.g., tungsten) is needed to add onto the crankshaft counterweights for balance requirements. The nodular iron crankshaft 12 is approximately 800 grams lighter than a comparably sized known counterpart forged steel crankshaft. In addition, a high strength and a high modulus nodular iron alloy is used for the crankshaft.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle crankshaft, comprising:
a crankshaft casting of a nodular iron including:
multiple main journals coaxially aligned on a common crankshaft casting axis; and
multiple crankpin journals fixedly connected to the main journals by individual webs;
multiple lightening holes, wherein individual ones of the multiple lightening holes are integrally formed within individual ones of the crankpin journals during casting, wherein each of the multiple lightening holes is V-shaped having a bottom V-section disposed between a first opening end and a second opening end; and
a bubble space that forms an indent in selected ones of the multiple lightening holes and located proximate to a mid-portion of selected ones of the multiple lightening holes of the crankpin journals, the bubble space outwardly directed with respect to the common crankshaft casting axis and oppositely positioned away from the bottom V-section, the bubble space including a top surface and a bottom surface, the bottom surface positioned closer to the common crankshaft casting axis than the top surface, the top surface having a first concave-shaped transition surface located proximate to and facing toward the first opening end, wherein the first concave-shaped transition surface transitions into a first convex-shaped surface which further transitions into a straight segment opposite to the bottom V-section, wherein the straight segment transitions into a second convex-shaped surface which further transitions into a second concave-shaped transition surface located proximate to and facing toward the second opening end, the bottom surface having a third concave-shaped transition surface located proximate to and facing toward the first opening end, wherein the third concave-shaped transition surface transitions into a bottom straight segment proximate-to the bottom V-section, wherein the bottom straight segment transitions into a fourth concave-shaped transition surface located proximate to and facing toward the second opening end, the bubble space locally increasing a passage size of the selected ones of the multiple lightening holes and reducing a mass of the individual ones of the crankpin journals, wherein a skin surface of the bubble space is approximately 0.5 mm deep and reduces at least one of a Young's modulus, a tensile strength and a fatigue strength at the skin surface.

2. The automobile vehicle crankshaft of claim 1, wherein:
a first opening end of the selected ones of the multiple lightening holes of the multiple crankpin journals have a first diameter and a second opening end of the selected ones of the multiple lightening holes have a second diameter.

3. The automobile vehicle crankshaft of claim 2, wherein the first diameter is smaller than the second diameter.

4. The automobile vehicle crankshaft of claim 1, wherein the Young's modulus of the skin surface of the bubble space is reduced by approximately 15% compared to an overall Young's modulus of the crankshaft casting.

5. The automobile vehicle crankshaft of claim 1, wherein the tensile strength of the skin surface of the bubble space is reduced by approximately 30% compared to an overall tensile strength of the crankshaft casting.

6. The automobile vehicle crankshaft of claim 1, wherein the fatigue strength of the skin surface of the bubble space is reduced by approximately 30% compared to an overall fatigue strength of the crankshaft casting.

7. The automobile vehicle crankshaft of claim 1, wherein the overall Young's modulus of the nodular iron is in a range of 175 to 195 GPa.

8. The automobile vehicle crankshaft of claim 1, further including a first main journal oilway formed in at least one of the multiple main journals.

9. A casting, comprising:
an automobile vehicle crankshaft casting of a nodular iron including:
multiple main journals coaxially aligned on a common crankshaft axis;
multiple crankpin journals fixedly connected to the main journals by individual webs; and
multiple counterweights fixedly connected to the casting;
multiple lightening holes, wherein the multiple main journals each include one of the multiple lightening holes integrally formed therein during casting and individual ones of the multiple crankpin journals each include one of the multiple lightening holes integrally formed therein during casting;

the multiple lightening holes of the multiple crankpin journals having a V-shaped geometry and having a bottom V-section disposed between a first opening end and a second opening end; and a bubble space that forms an indent in selected ones of the multiple lightening holes, wherein the bubble space is located proximate to a mid-portion of selected ones of the multiple lightening holes of the multiple crankpin journals, the bubble space outwardly directed with respect to the common crankshaft casting axis and oppositely positioned away from the bottom V-section, the bubble space including a top surface and a bottom surface, the bottom surface positioned closer to the common crankshaft casting axis than the top surface, the top surface having a first concave-shaped transition surface located proximate to and facing toward the first opening end, wherein the first concave-shaped transition surface transitions into a first convex-shaped surface which further transitions into a straight segment opposite to the bottom V-section, wherein the straight segment transitions into a second convex-shaped surface which further transitions into a second concave-shaped transition surface located proximate to and facing toward the second opening end, the bottom surface having a third concave-shaped transition surface located proximate to and facing toward the first opening end, wherein the third concave-shaped transition surface transitions into a bottom straight segment proximate-to the bottom V-section, wherein the bottom straight segment transitions into a fourth concave-shaped transition surface located proximate to and facing toward the second opening end, the bubble space locally increasing a passage size of the selected ones of the multiple lightening holes and reducing a mass of the individual ones of the multiple crankpin journals, wherein a skin surface of the bubble space is approximately 0.5 mm deep and reduces at least one material property of the crankshaft casting.

10. The casting of claim 9, wherein an oil passage extending into individual ones of the multiple crankpin journals passes outside of the multiple lightening holes.

11. The casting of claim 9, wherein the V-shaped geometry and the bubble space of the multiple lightening holes of the multiple crankpin journals normalize a stress across a length of the automobile vehicle crankshaft casting.

12. The casting of claim 9, wherein the V-shaped geometry and the bubble space of the multiple lightening holes balance the automobile vehicle crankshaft casting.

13. The casting of claim 9, wherein the Young's modulus of the skin surface of the bubble space is reduced by approximately 15% compared to an overall Young's modulus of the crankshaft casting.

14. The casting of claim 9, wherein the tensile strength of the skin surface of the bubble space is reduced by approximately 30% compared to an overall tensile strength of the crankshaft casting.

15. The casting of claim 9, wherein the fatigue strength of the skin surface of the bubble space is reduced by approximately 30% compared to an overall fatigue strength of the crankshaft casting.

16. A method to produce an automobile vehicle crankshaft, comprising:

creating a casting of a nodular iron including:
coaxially aligning multiple main journals on a common crankshaft axis; and
fixedly connecting multiple crankpin journals between successive ones of the multiple main journals by individual webs;

forming multiple lightening holes, wherein individual ones of the multiple lightening holes are formed within individual ones of the multiple crankpin journals during casting, wherein each of the multiple lightening holes is V-shaped having a bottom V-section disposed between a first opening end and a second opening end; and locating a bubble space that forms an indent in selected ones of the multiple lightening holes proximate to a mid-portion of selected ones of the multiple lightening holes, the bubble space outwardly directed with respect to the common crankshaft casting axis and oppositely positioned away from the bottom V-section, the bubble space including a top surface and a bottom surface, the bottom surface positioned closer to the common crankshaft casting axis than the top surface, the top surface having a first concave-shaped transition surface located proximate to and facing toward the first opening end, wherein the first concave-shaped transition surface transitions into a first convex-shaped surface which further transitions into a straight segment opposite to the bottom V-section, wherein the straight segment transitions into a second convex-shaped surface which further transitions into a second concave-shaped transition surface located proximate to and facing toward the second opening end, the bottom surface having a third concave-shaped transition surface located proximate to and facing toward the first opening end, wherein the third concave-shaped transition surface transitions into a bottom straight segment proximate-to the bottom V-section, wherein the bottom straight segment transitions into a fourth concave-shaped transition surface located proximate to and facing toward the second opening end, the bubble space locally increasing a passage size of the selected ones of the multiple lightening holes and thereby reducing a mass of the individual ones of the multiple crankpin journals, wherein a skin surface of the bubble space is approximately 0.5 mm deep and reduces at least one of a Young's modulus, a tensile strength and a fatigue strength at the skin surface.

17. The method of claim 16, further including interspacing multiple counterweights along the casting, the multiple counterweights also cast of the nodular iron.

18. The method of claim 16, wherein the tensile strength of the skin surface of the bubble space is reduced by approximately 30% compared to an overall tensile strength of the crankshaft casting.

19. The method of claim 16, wherein the fatigue strength of the skin surface of the bubble space is reduced by approximately 30% compared to an overall fatigue strength of the crankshaft casting.

20. The method of claim 16, wherein the overall Young's modulus of the nodular iron is in a range of 175 to 195 GPa.

* * * * *